(12) United States Patent
Honton (10) Patent No.: US 9,223,672 B1
(45) Date of Patent: Dec. 29, 2015

(54) METHOD AND SYSTEM FOR PROVIDING ERROR REPAIR STATUS DATA TO AN APPLICATION USER

(71) Applicant: Intuit Inc., Mountain View, CA (US)

(72) Inventor: Charles Richard Honton, Cleveland Heights, OH (US)

(73) Assignee: Intuit Inc., Mountain View, CA (US)

( * ) Notice: Subject to any disclaimer, the term of this patent is extended or adjusted under 35 U.S.C. 154(b) by 135 days.

(21) Appl. No.: 14/035,701

(22) Filed: Sep. 24, 2013

(51) Int. Cl.
*G06F 11/00* (2006.01)
*G06F 11/32* (2006.01)

(52) U.S. Cl.
CPC ............ *G06F 11/324* (2013.01); *G06F 11/327* (2013.01)

(58) Field of Classification Search
CPC .............................. G06F 11/324; G06F 11/327
See application file for complete search history.

(56) References Cited

U.S. PATENT DOCUMENTS

| 8,126,786 B1* | 2/2012 | Bober ............................... 705/31 |
| 8,527,814 B1* | 9/2013 | Elwell et al. ................. 714/38.1 |
| 8,819,704 B1* | 8/2014 | Hosaagrahara et al. ...... 719/318 |
| 2006/0161551 A1* | 7/2006 | Liebling .......................... 707/10 |
| 2013/0305083 A1* | 11/2013 | Machida ........................ 714/4.1 |
| 2014/0298093 A1* | 10/2014 | Cook et al. ....................... 714/27 |

* cited by examiner

*Primary Examiner* — Philip Guyton
(74) *Attorney, Agent, or Firm* — Hawley Troxell Ennis & Hawley LLP; Philip McKay (57) ABSTRACT

Application user contact data associated with an application user is obtained indicating how to contact the application user. Application user identification data is then assigned to the application user. Application request data requesting access to the application, and/or a feature/operation associated with the application, and/or data associated with the application, is received and request identification data is assigned to the application request data. When error data associated with the application request data indicating an error has occurred is received, an error repair status data location is designated and error repair status data associated with the error is provided to/stored in the error repair status data location. Application user error notification data is then generated and provided to the application user including data for accessing the error repair status data in the designated error repair status data location.

27 Claims, 3 Drawing Sheets

METHOD AND SYSTEM FOR PROVIDING ERROR REPAIR STATUS DATA TO AN APPLICATION USER

BACKGROUND

One of the side effects of data processing applications and systems being moved to the "cloud", and/or various other remote access/application server architectures, is that many users of the data processing applications and systems feel that they have lost control of their data and their particular implementation of the data processing applications and systems.

One specific problem feeding this perception, is that currently when an error occurs in the implementation of an application being accessed by an application user, the application user receives, at best, a notification simply stating that the error has occurred, and often the application users only indication that an error has occurred is that the application fails to function, and/or the application user's display screen locks up.

Currently, once the application user becomes aware that an error has occurred, the application user's only recourse is to either repeatedly attempt to access the application and perform the desired task, and/or continually poll the application, and/or application server, in attempt to reinitiate use of the application, or to shut down the application implementation/instance and start over. Not only is this an inefficient and frustrating process from the perspective of the application user, but it also leaves the application user with a sense that they are more or less "helpless" to resolve the problem and that nothing is being done by the application provider to address the issue. Currently, this impression is often left with the application user even in cases when the encountered error actually is being addressed behind the scenes by the application provider, but it is taking time to repair error.

Unfortunately, despite the fact that the application provider may indeed be in the process of repairing the error, the current lack of communication leaves the application user with the sense that their needs and their situation are unimportant to the application provider. Therefore, in many cases, instead of waiting for the application error to be repaired, the application user often simply leaves the application, and in many cases, provides negative reviews and/or evaluation data.

Clearly, the situation above is undesirable for both the application user and the provider of the application. What is needed is a method and system for providing an application user access to data indicating the status of the efforts to repair an error that occurs in an application implementation. In addition, what is needed, is a method and system that also informs the application user of the best next step to take to either repair or circumvent the error in the application instance, or what action to take once the error has been repaired by the application provider.

SUMMARY

A method and system for providing error repair status data to an application user includes a process for providing error repair status data to an application user whereby, in accordance with one embodiment, when an application user registers, or otherwise signs up, to use an application offered through an application provider, application user contact data associated with the application user is obtained indicating how to contact the application user and access/account data necessary to do so. In one embodiment, application user identification data is then assigned to the application user.

In one embodiment, application request data associated with the application user requesting access to the application, and/or a feature/operation associated with the application, and/or data associated with the application, is received. In one embodiment, request identification data is assigned to the application request data. The application user identification data and the request identification data are then associated with the application request data.

In one embodiment, if, and when, error data associated with the application request data indicating an error has occurred is received, an error repair status data location is designated for storing error repair status data associated with the repair of the error. In one embodiment, error repair status data associated with the error is then provided to the error repair status data location. In one embodiment, application user error notification data is then generated including error repair status access data representing data for accessing the error repair status data associated with the error in the designated error repair status data location.

In one embodiment, the application user error notification data, including the error repair status access data, is provided to the application user, thereby allowing the application user to access and view the error repair status data.

A method and system for providing error repair status data to an application user includes a process for providing error repair status data to an application user whereby, in accordance with one embodiment, when an application user registers, or otherwise signs up, to use an application offered through an application provider, application user contact data associated with the application user is obtained indicating how to contact the application user and access/account data necessary to do so. In one embodiment, application user identification data is then assigned to the application user.

In one embodiment, application request data associated with the application user requesting access to the application, and/or a feature/operation associated with the application, and/or data associated with the application, is received. In one embodiment, request identification data is assigned to the application request data. The application user identification data and the request identification data are then associated with the application request data.

In one embodiment, if, and when, error data associated with the application request data indicating an error has occurred is received, application user error notification data including error repair status data associated with the repair of the error associated with the error data is generated. In one embodiment, the application user error notification data, including the error repair status data associated with the repair of the error associated with the error data, is then provided to the application user, thereby providing the application user updated error repair status data automatically.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In one embodiment, a process for providing error repair status data to an application user includes one or more applications, applets, mobile applications, and/or processes implemented on one or more computing systems, such as an application user computing system, and/or an application server computing system.

In one embodiment, one or more of the computing systems are a mobile computing system such as a smart phone, or other mobile device. However, as used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein.

In addition, as used herein, the term computing system, can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to: any general network, communications network, or general network/communications network system; a cellular network; a wireless network; a combination of different network types; a public network; a private network; a satellite network; a dial up network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a dial up network; any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In accordance with one embodiment, one or more data applications are provided by an application provider. In various embodiments, an application provider provides access to the application through one or more mechanisms, processes, and/or procedures, including via the Internet, and/or any "cloud-based" architecture, and/or one or more remote application servers, databases, and/or other computing systems.

In various embodiments, the one or more applications are any software applications as discussed herein, and/or as known in the art at the time of filing, and/or as developed after the time of filing, through which a remote application user can provide data, access data, request specific processing, and/or otherwise implement an instance of the application for business or personal use by the application user, and/or one or more agents acting on behalf of the application user.

In one embodiment, at the time the application user signs up for, or otherwise registers with, the application and/or the application provider, the application user is provided the opportunity to take part in, i.e. opt into, the process for providing error repair status data to an application user. In one embodiment, as part of the registration process the application user is asked to provide contact data associated with the application user. In various embodiments, the contact data associated with the application user includes, but is not limited to, one or more of the following, an email address associated with the application user; a telephone number associated with the application user; a telephone number for receiving text messages associated with the application user; access data for a social media account associated with the application user; and/or any other data that can be used to contact the application user by the preferred method indicated by the application user, as discussed herein, and/or as known in the art at the time of filing, and/or as developed/made available after the time of filing.

In one embodiment, the application user is asked to provide application user contact data once an error is detected as part of the error notification process discussed below.

In one embodiment, once, as part of the registration process, or as part of the error notification process, the application user provides application user contact data and/or is registered with the application provider, unique application user identification data is assigned to the application user, and/or an account/file is created for the application user that includes, and/or is identified by, the application user identification data. In one embodiment, as discussed below, the application user identification data is included with each application request submitted by the application user so that, if an error occurs, the application user can be identified and associated with the error data.

In one embodiment, application request data is received from the application user, or more specifically, a computing system associated with the application user. In various embodiments, the application request data represents a request by the application user to either access the application, or to access, and/or use, various features and/or functionality associated with the application, and/or generated by the application.

In one embodiment, request identification data is generated and assigned to the application request data. As discussed below, in the event of an error, the request identification data is used to uniquely identify the application request that resulted in the error. Consequently, in one embodiment, the application request data includes, and/or is associated with, both the application user identification data, identifying the application user, and request identification data, identifying the specific application request.

In various embodiments, the application request data, application user identification data, and request identification data, are correlated, mapped, and/or stored in an application request log. In one embodiment, the application request data, application user identification data, and request identification data, are processed and managed using an application request processing and management system, such as a designated computing system, and/or portion of a computing system.

In one embodiment, if an error occurs while the application function associated with the application request data is being performed, error data associated with the application request data indicating an error has occurred is generated and received.

In one embodiment, the error data is received from the application, and/or the application provider, based on one or more identified error conditions being associated with the operation being performed in response to the application request data. In one embodiment, the error data is received as, and/or in association with, one or more predetermined error messages.

In one embodiment, the error data is received from an application language exception. In one embodiment, the error data is received from an operating system signal.

In one embodiment, the error data is received from one or more computing systems associated with the application user, and used to access the application and submit the application request data. In various embodiments, the error data is generated in response to monitoring the operation of the implementation of the application used by the application user and the identification of an error occurring such as, but not limited to, a display lockup, a blue screen event, more than a threshold level of idle time, i.e., more than a threshold period of inactivity, and/or any other indication that an error has occurred in the implementation of the application, as discussed herein, and/or as known in the art at the time of filing, and/or as developed/made available after the time of filing.

In one embodiment, once error data is received, an error repair status data location is automatically generated and/or designated. In various embodiments, the error repair status data location can be, but is not limited to, one or more of, a location in a memory or other data store/database where error repair status data associated with the error will be located/stored/displayed, and/or updated; a location or account in a memory or other data store/database, where error repair status data will be located/stored, and/or updated; a website, or other network-based location, where error repair status data will be located/stored/displayed, and/or updated; and/or any other data store or database, or other means, mechanism, process, or procedure through which error repair status data can be stored, displayed, updated, and/or accessed by one or more parties.

In one embodiment, once an error repair status data location is generated and/or designated, error repair status data is obtained from one or more modules, systems, and/or parties, indicating the steps being taken to correct the error associated with the error data and the error repair status data is automatically transferred to the error repair status data location. In addition, in one embodiment, the error repair status data in the error repair status data location is updated on a periodic basis, and/or as the status of the error repair changes.

In one embodiment, once error data is received, the application user identification data and the request identification data associated with the application request data that resulted in the error is used to generate application user error notification data to be provided to the application user. In various embodiments, the application user error notification data includes error repair status access data representing data necessary for accessing the designated error repair status data location and the error repair status data associated with the error.

In one embodiment, the application user error notification data, including the error repair status access data, is provided to the application user using the provided application user contact data. In one embodiment, the application user is thereby provided access to the error repair status data and all updates to the error repair status data so that the application user can not only be assured that the error is being addressed, but the application user can see the progress made in correcting the error.

In addition, in one embodiment, the error repair status data in the error repair status data location also includes data indicating what step, or steps, the application user should take to either correct the error on their own, or should be taken once the error has been repaired.

As a specific illustrative example of one embodiment, is stipulated that an application user decides to participate in the process for providing error repair status data. In this specific illustrative example, as part of the registration process, the application user provides application user contact data indicating an SMS text phone number associated with the application user and that this is the preferred method of contact for the application user.

In this specific illustrative example, unique application user identification data is then assigned to the application user. In this specific illustrative example, when the application user begins to make use of the application, application request data is generated and sent from a computing system associated with the application user. In this specific illustrative example, the application request data is assigned application identification data uniquely identifying the specific application request.

In this specific illustrative example, it is stipulated that, in the course of performing the operation associated with the application request data, an error occurs. Consequently, error data is generated and received by a computing system associated with a provider of the application, such as an application server system. In this specific illustrative example, once the error data is received, a work order, or repair, ticket is automatically generated using the user identification data and request identification data and assigned to the error data associated with the application request data. In this specific illustrative example, once the error data is received, a unique website, or an account/location within a website, is generated and assigned to the error data and the application request data.

In this specific illustrative example, the error data is forwarded to an error repair module, and/or error repair function, and/or a manual error repair process, where the process of repairing the error is begun. As the error is being repaired, error repair status data is generated by the error repair module and forwarded to the website, or an account/location within the website, assigned to the error data and the application request data.

In this specific illustrative example, application user error notification data is then generated including error repair status access data, in this specific illustrative example, data indicating the URL, or link, to the website or an account/location within the website, assigned to the error data and the application request data. In this specific illustrative example, the application user error notification data is then provided to the application user via an SMS message sent to the application user using the phone number included in the application user contact data provided as part of the application registration process.

In this specific illustrative example, the error repair status data is updated by the error repair module every minute, and/or as a threshold level of progress is made towards fixing the error. In this specific illustrative example, the application user can follow the progress towards repairing the error by simply using the URL provided in the application user error notification data to access the website, or an account/location within the website, associated with the error data and the application request data.

In this specific illustrative example, once the error is repaired, the application user is notified of this fact through the website, or an account/location within the website, and the application user is informed that rather than shutting down and restarting the application, all the application user needs to do is reenter their password and activate the next icon in order to resume the application and the operation requested via the application request data.

Using the method and system for providing error repair status data to an application user discussed above, an application user is immediately and automatically informed that the application provider is aware of an encountered application error and is taking steps to repair the error. Consequently, using the method and system for providing error repair status data to an application user discussed above, the application user receives immediate confirmation that the problem is being addressed. In addition, in one embodiment, the application user is provided access to a data store where error repair status data is provided and updated so that the application user is continuously appraised of the progress being made to correct the error.

Consequently, using the method and system for providing error repair status data to an application user discussed above, application users are provided the assurance that the error they are experiencing is being dealt with and they are provided the information necessary to understand how the error is being dealt with and what the status of the repair actually is at any given time. Therefore, the application user is made to feel that their concerns are important to the application provider, and are being addressed in a timely and efficient manner.

In accordance with one embodiment, one or more data applications are provided by an application provider.

In one embodiment, at the time the application user signs up for, or otherwise registers with, the application and/or the application provider, the application user is provided the opportunity to take part in, i.e. opt into, the process for providing error repair status data to an application user. In one embodiment, as part of the registration process, the application user is asked to provide contact data associated with the application user. In various embodiments, the contact data associated with the application user includes, but is not limited to, one or more of the following, an email address associated with the application user; a telephone number associated with the application user; a telephone number for receiving text messages associated with the application user; social media account access data; and/or any other data that can be used to contact the application user by the preferred method indicated by the application user, as discussed herein, and/or as known in the art at the time of filing, and/or as developed/made available after the time of filing.

In one embodiment, the application user is asked to provide application user contact data once an error is detected as part of the error notification process discussed below.

In one embodiment, once, as part of the registration process, or as part of the error notification process, the application user provides application user contact data and/or is registered with the application provider, unique application user identification data is assigned to the application user, and/or an account/file is created for the application user that includes, and/or is identified by, the application user identification data. In one embodiment, as discussed below, the application user identification data is included with each application request submitted by the application user so that, if an error occurs, the application user can be identified and associated with the error data.

In one embodiment, application request data is received from the application user, or more specifically, a computing system associated with the application user. In various embodiments, the application request data represents a request by the application user to either access the application or to access, and/or use, various features and/or functionality associated with the application, and/or generated by the application.

In one embodiment, request identification data is generated and assigned to the application request data. As discussed below, in the event of an error, the request identification data is used to uniquely identify the application request that resulted in the error. Consequently, in one embodiment, the application request data includes, and/or is associated with, both application user identification data, identifying the application user, and request identification data, identifying the specific application request.

In various embodiments, the application request data, application user identification data, and request identification data, are correlated, mapped, and/or stored in an application request log. In one embodiment, the application request data, application user identification data, and request identification data, are processed and managed using an application request processing and management system, such as a designated computing system, and/or portion of a computing system.

In one embodiment, if an error occurs while the application function associated with the application request data is being performed, error data associated with the application request data indicating an error has occurred is generated and received.

In one embodiment, the error data is received from the application, and/or the application provider, based on one or more identified error conditions being associated with the operation being performed in response to the application request data. In one embodiment, the error data is received as, and/or in association with, one or more predetermined error messages.

In one embodiment, the error data is received from an application language exception. In one embodiment, the error data is received from an operating system signal.

In one embodiment, the error data is received from one or more computing systems associated with the application user, and used to access the application and submit the application request data. In various embodiments, the error data is generated in response to monitoring the operation of the implementation of the application used by the application user and the identification of an error occurring such as, but not limited to, a display lockup, a blue screen event, more than a threshold level of idle time, i.e., more than a threshold period of inactivity, and/or any other indication that an error has occurred in the implementation of the application, as discussed herein, and/or as known in the art at the time of filing, and/or as developed/made available after the time of filing.

In one embodiment, once error data is received, application user error notification data is generated. In one embodiment, the application user error notification data includes error repair status data associated with the repair of the error and indicating the status of the repair operations associated with the error data. In one embodiment, the application user error notification data, including the error repair status data associated with the repair of the error associated with the error data, is provided to the application user using the application user contact data obtained from the application user at the time the application user registered with the application provider and/or signed up for the process for providing error repair status data to an application user.

In addition, as the status of the error repair changes, i.e., as the error repair status data changes, additional application user error notification data, including the updated error repair status data, is generated and provided to the application user using the application user contact data. Consequently, the application user is provided initial application user error notification data and updated error repair status data automatically and on a periodic, and/or status change, basis.

In addition, in one embodiment, the error repair status data also includes data indicating what step, or steps, the application user should take to either correct the error on their own, or should be taken once the error has been repaired.

As a specific illustrative example of one embodiment, is stipulated that an application user decides to participate in the process for providing error repair status data. In this specific illustrative example, as part of the registration process, the application user provides application user contact data indicating an email address associated with the application user and that this is the preferred method of contact for the application user.

In this specific illustrative example, unique application user identification data is then assigned to the application user. In this specific illustrative example, when the application user begins to make use of the application, application request data is generated and sent from a computing system associated with the application user. In this specific illustrative example, the application request data is assigned application identification data uniquely identifying the specific application request.

In this specific illustrative example, it is stipulated that in the course of performing the operation associated with the application request data an error occurs. Consequently, error data is generated and received by a computing system associated with a provider of the application, such as an application server system. In this specific illustrative example, once the error data is received, a work order, or repair, ticket is automatically generated using the user identification data and request identification data and assigned to the error data associated with the application request data.

In this specific illustrative example, the error data is forwarded to an error repair module, and/or error repair function, and/or a manual error repair process, where the process of repairing the error is begun. As the error is being repaired, error repair status data is generated by the error repair module and is included in application user error notification data generated and provided to the application user via an email message sent to the application user using the email address included in the application user contact data provided as part of the application registration process.

In this specific illustrative example, the error repair status data is updated by the error repair module every minute, and/or as a threshold level of progress is made towards fixing the error. In this specific illustrative example, new application user error notification data, including the updated error repair status data, is sent to the application user using the email address included in the application user contact data provided as part of the application registration process. Consequently, the application user can follow the progress towards repairing the error.

In this specific illustrative example, once the error is repaired, the application user is notified of this fact through final application user error notification data, including the updated error repair status data, sent to the application user's email address and the application user is informed that rather than shutting down and restarting the application, all the application user needs to do is re-enter their login name and password and activate the resume icon in order to resume the application and the operation requested via the application request data.

Using the method and system for providing error repair status data to an application user discussed above, an application user is immediately and automatically informed that the application provider is aware of an encountered application error and is taking steps to repair the error. Consequently, using the method and system for providing error repair status data to an application user discussed herein, the application user receives immediate confirmation that the problem is being addressed. In addition, in one embodiment, the application user is provided updated error repair status data so that the application user is continuously appraised of the progress being made to correct the error. Consequently, using the method and system for providing error repair status data to an application user discussed above, application users are provided the assurance that the error they are experiencing is being dealt with and they are provided the information necessary to understand how the error is being dealt with and what the status of the repair actually is at any given time. Therefore, the application user is made to feel that their concerns are important to the application provider, and are being addressed in a timely and efficient manner.

Hardware System Architecture

Figure 1:
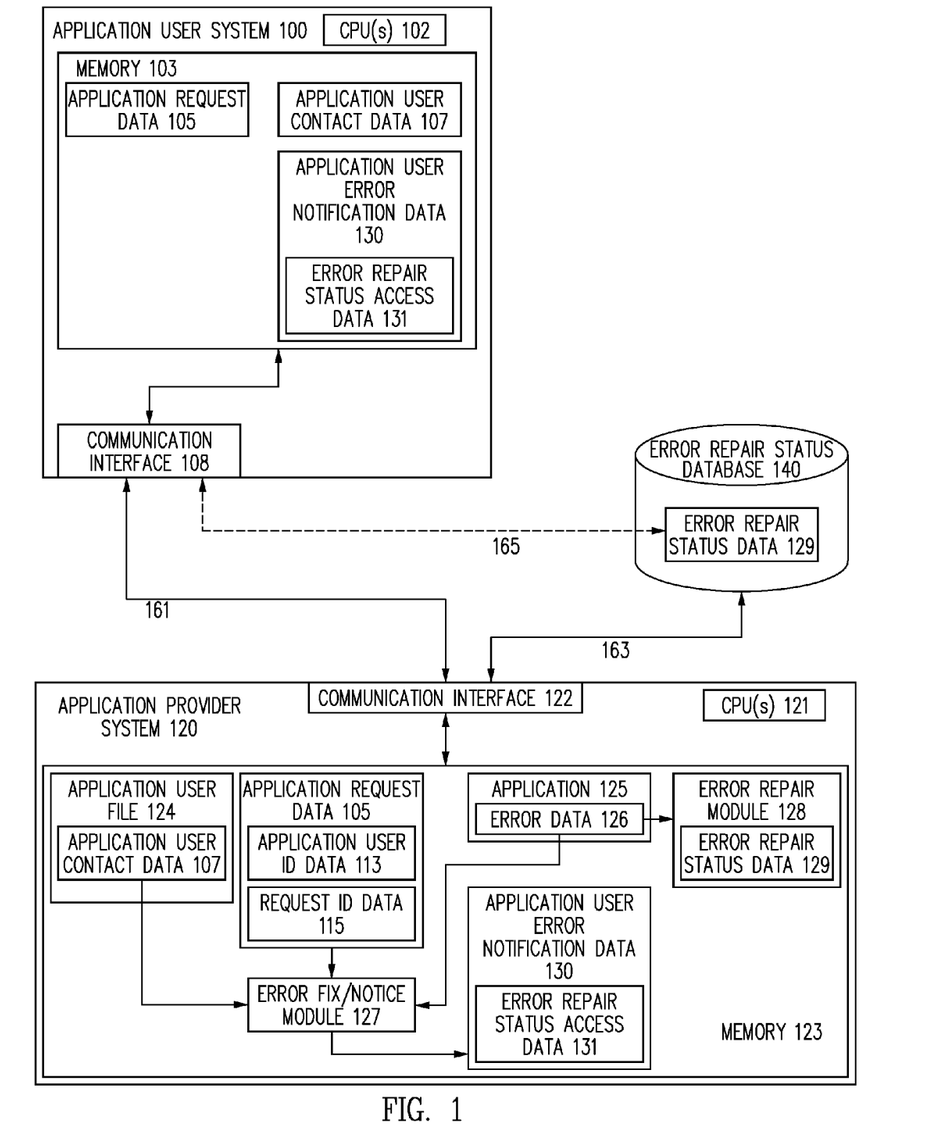
FIG. 1 is a block diagram of an exemplary hardware architecture for implementing one embodiment.

FIG. 1 is a block diagram of an exemplary hardware architecture for implementing one embodiment of a process for providing error repair status data to an application user, such as exemplary processes 200 (FIG. 2) and 300 (FIG. 3), discussed herein.

FIG. 1 includes application user system 100, i.e., a computing system accessible by an application user and used to access an application 125 provided through application provider system 120; application provider system 120, e.g., a computing and/or server system, such as an application server, used to provide application 125 and implementing at least part of the process for providing error repair status data to an application user; and error repair status database 140, e.g., an error repair status data location where error repair status data 129 is stored; all operatively coupled by communications channels 161, 163, and 165.

As seen in FIG. 1, application user system 100 includes Central Processing Unit(s) 102, CPU(s) 102; memory 103 and communication interface 108. As seen in FIG. 1, memory 103 includes application request data 105, application user contact data 107, and application user error notification data 130, including error repair status access data 131, as received from application provider system 120 via communication interface 122, communications channel 161, and communication interface 108. In various embodiments, application user system 100 is a mobile computing system such as a smart phone, or other mobile device. However, in various embodiments, application user system 100 can be any computing system as discussed herein, and/or as known in the art at the time of filing, and/or as developed after the time of filing.

As seen in FIG. 1 application provider system 120 includes Central Processing Unit(s) (CPUs 121), memory 123, and communications interface 122. As seen in FIG. 1, memory 123 includes application user file 124, including application user contact data 107, as received from application user system 100 via communication interface 108 communications channel 161, and communication interface 122; application request data 105, as received from application user system 100 via communication interface 108 communications channel 161, and communication interface 122; application user ID data 113, as assigned by application provider system 120 to the application user associated with application user system 100; application request ID data 115, as assigned by application provider system 120 to application request data 105; application 125, including error data 126 indicating, in one example, an error associated with the operation of application request data 105; error fix/notice module 127; error repair module 128 charged with repairing the error of error data 126 and generating error repair status data 129; and application user error notification data 130, generated by error fix/notification module 127, and including error repair status access data 131 pointing to the error repair status database 140 and error repair status data 129, and as sent to application user system 100 via communication interface 122, communications channel 161, and communication interface 108.

In various embodiments, application provider system 120 can be any computing system as discussed herein, and/or as known in the art at the time of filing, and/or as developed after the time of filing.

Also shown in FIG. 1 is error repair database 140, including error repair status data 129, as received from error repair module 128 via communication interface 122 and communications channel 163, and accessible by application user system 100 via communication interface 108 and communications channel 165.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to an on-line function. Herein, the term "database" can refer to any data storage means that is part of, or under the control of, any computing system, as discussed herein, known at the time of filing, or as developed thereafter.

In one embodiment, any, or all of, communications channels 161, 163, and 165 can be, but is not limited to: any network; a mobile communication link, such as a mobile phone link; a land-line phone link; a cable-based communications channel; a satellite communications channel; the Internet, a cloud, or other network communications channel; and/or any other communications channel, or combination of communications channels, as discussed herein, and/or as known in the art at the time of filing, and/or as developed after the time of filing.

In various embodiments, an application provider provides access to application 125 through application provider system 120 and the Internet, and/or any "cloud-based" architecture, and/or one or more remote application servers, databases, and/or other computing systems.

In various embodiments, application 125 is any software application as discussed herein, and/or as known in the art at the time of filing, and/or as developed after the time of filing, through which a remote application user can provide data, access data, request specific processing, and/or otherwise implement an instance of application 125 for business or personal use by the application user, and/or one or more agents acting on behalf of the application user.

In one embodiment, at the time the application user signs up for, or otherwise registers with, application 125 and/or application provider system 120, the application user is provided the opportunity to take part in, i.e. opt into, the process for providing error repair status data to an application user. In one embodiment, as part of the registration process, the application user is asked to provide application user contact data 107 associated with the application user. In various embodiments, contact data 107 includes, but is not limited to, one or more of the following, an email address associated with the application user; a telephone number associated with the application user; a telephone number for receiving text messages associated with the application user; access data for a social media account associated with the application user; and/or any other data that can be used to contact the application user by the preferred method indicated by the application user, as discussed herein, and/or as known in the art at the time of filing, and/or as developed/made available after the time of filing.

In one embodiment, the application user is asked to provide application user contact data once an error is detected as part of the error notification process discussed below.

In one embodiment, once, as part of the registration process, or as part of the error notification process, the application user provides contact data 107 and/or is registered with the application provider, application user ID data 113 is assigned to the application user, and/or application user file 124 is created for the application user that includes, and/or is identified by, application user ID data 113. In one embodiment, as discussed below, application user ID data 113 is included with application request data 105 submitted by the application user so that, if an error occurs, the application user can be identified and associated with error data 126.

In one embodiment, application request data 105 is received from the application user, or more specifically, application user system 100. In various embodiments, application request data 105 represents a request by the application user to either access application 125, or to access, and/or use, various features and/or functionality associated with application 125, and/or generated by application 125.

In one embodiment, request ID data 115 is generated and assigned to application request data 105. As discussed below, in the event of an error, request ID data 115 is used to uniquely identify application request data 105 that resulted in error data 126. Consequently, in one embodiment, application request data 105 includes, and/or is associated with, both application user ID data 113, identifying the application user, and request identification data 115, identifying the specific application request data 105.

In various embodiments, application request data 105, application user ID data 113, and request identification data 115, are correlated, mapped, and/or stored in an application request log (not shown). In one embodiment, application request data 105, application user ID data 113, and request identification data 115, are processed and managed using an application request processing and management system (not shown), such as a designated computing system, and/or portion of a computing system.

In one embodiment, if an error occurs while the application function associated with application request data 105 is being performed, error data 126 associated with application request data 105 indicating an error has occurred is generated and received.

In one embodiment, error data 126 is received from application 125, and/or application provider system 120, based on one or more identified error conditions being associated with the operation being performed in response to application request data 105. In one embodiment, error data 126 is received as, and/or in association with, one or more predetermined error messages.

In one embodiment, error data 126 is received from an application language exception. In one embodiment, error data 126 is received from an operating system signal.

In one embodiment, error data 126 is received from application user system 100 associated with the application user, and used to access application 125 and submit application request data 105. In various embodiments, error data 126 is generated in response to monitoring the operation of the implementation of application 125 used by the application user and the identification of an error occurring such as, but not limited to, a display lockup, a blue screen event, more than a threshold level of idle time, i.e., more than a threshold period of inactivity, and/or any other indication that an error has occurred in the implementation of application 125, as discussed herein, and/or as known in the art at the time of filing, and/or as developed/made available after the time of filing.

In one embodiment, once error data 126 is received, an error repair status data location is automatically generated and/or designated by error fix/notice module 127. In various embodiments, the error repair status data location is error repair status database 140, or a designated account or portion of error repair status database 140 and can be, but is not limited to, one or more of, a location in a memory or other data store/database where error repair status data 129 associated with error data 126 will be located/stored/displayed, and/or updated; a location or account in a memory or other data store/database, where error repair status data 129 associated with error data 126 will be located/stored, and/or updated; a website, or other network-based location, where error repair status data 129 associated with error data 126 will be located/stored/displayed, and/or updated; and/or any other data store or database, or other means, mechanism, process, or procedure through which error repair status data 129 associated with error data 126 can be stored, displayed, updated, and/or accessed by one or more parties.

In one embodiment, once an error repair status data location is generated and/or designated by error fix/notice module 127, error repair status data 129 is obtained from error repair module 128, indicating the steps being taken to correct the error associated with error data 126 and error repair status data 129 is automatically transferred to the error repair status data location, e.g., error repair status database 140. In addition, in one embodiment, error repair status data 129 in error repair status database 140 is updated on a periodic basis, and/or as the status of the error repair changes.

In various embodiments, error repair module 128 is representative of a manual error repair tracking system that includes error repair status database 140 and error repair status data 129. In one embodiment, error repair module 128 is representative or a semi-automatic error repair tracking system that includes error repair status database 140 and error repair status data 129.

In one embodiment, once error data 126 is received, error fix/notice module 127 uses application user ID data 113 and request ID data 115 associated with application request data 105 that resulted in the error to generate application user error notification data 130 to be provided to the application user via application user system 100. In various embodiments, application user error notification data 130 includes error repair status access data 131 representing data necessary for accessing error repair status data 129 in error repair status database 140 associated with the error of error data 126 form application user system 100 via communication interface 108 and communications channel 165.

In one embodiment, application user error notification data 130, including error repair status access data 131, is provided to the application user using the provided application user contact data 107. In one embodiment, the application user is thereby provided access to error repair status data 129 via communication interface 108 and communications channel 165, and all updates to error repair status data 129 so that the application user can not only be assured that the error of error data 126 is being addressed, but the application user can see the progress made in correcting the error.

In addition, in one embodiment, error repair status data 129 in error repair status database 140 also includes data indicating what step, or steps, the application user should take to either correct the error on their own, or should be taken once the error has been repaired.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, when an application user registers, or otherwise signs up, to use an application offered through an application provider, application user contact data associated with the application user is obtained indicating how to contact the application user and access/account data necessary to do so. In one embodiment, application user identification data is assigned to the application user.

In one embodiment, application request data associated with the application user requesting access to the application, and/or a feature/operation associated with the application, and/or data associated with the application, is received. In one embodiment, request identification data is assigned to the application request data. The application user identification data and the request identification data are then associated with the application request data.

In one embodiment, if, and when, error data associated with the application request data indicating an error has occurred is received, an error repair status data location is designated for storing error repair status data associated with the repair of the error. In one embodiment, error repair status data associated with the error is then provided to the error repair status data location. In one embodiment, application user error notification data is then generated including error repair status access data representing data for accessing error repair status data associated with the error in the designated error repair status data location.

In one embodiment, the application user error notification data, including the error repair status access data, is provided to the application user, thereby allowing the application user to access and view the error repair status data.

Figure 2:
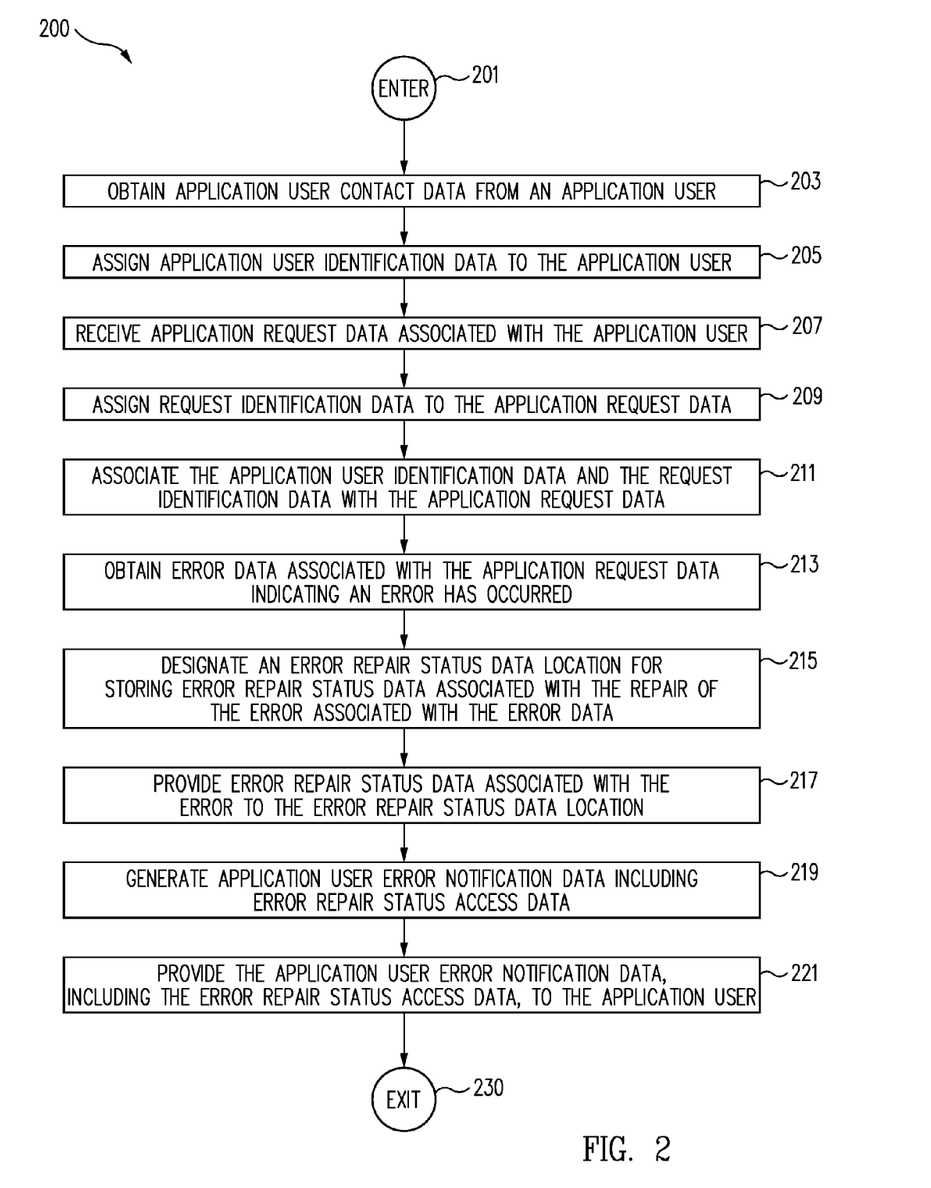
FIG. 2 is a flow chart depicting a process for providing error repair status data to an application user in accordance with one embodiment.

FIG. 2 is a flow chart depicting a process 200 for providing error repair status data to an application user in accordance with one embodiment.

Process 200 for providing error repair status data to an application user begins at ENTER OPERATION 201 of FIG. 2 and process flow proceeds to OBTAIN APPLICATION USER CONTACT DATA FROM AN APPLICATION USER OPERATION 203.

In accordance with one embodiment, one or more data applications are provided by an application provider. In various embodiments, an application provider provides access to an application through one or more mechanisms, processes, and/or procedures, including via the Internet, and/or any "cloud-based" architecture, and/or one or more remote application servers, databases, and/or other computing systems.

In various embodiments, the one or more applications are any software applications as discussed herein, and/or as known in the art at the time of filing, and/or as developed after the time of filing, through which a remote application user can provide data, access data, request specific processing, and/or otherwise implement an instance of the application for business or personal use by the application user, and/or one or more agents acting on behalf of the application user.

In one embodiment, at the time the application user signs up for, or otherwise registers with, the application and/or the application provider, the application user is provided the opportunity to take part in, i.e. opt into, process 200 for providing error repair status data to an application user.

In one embodiment, at OBTAIN APPLICATION USER CONTACT DATA FROM AN APPLICATION USER OPERATION 203 as part of the registration process the application user is asked to provide contact data associated with the application user.

In various embodiments, the contact data associated with the application user of OBTAIN APPLICATION USER CONTACT DATA FROM AN APPLICATION USER OPERATION 203 includes, but is not limited to, one or more of the following, an email address associated with the application user; a telephone number associated with the application user; a telephone number for receiving text messages associated with the application user; social media account access data associated with the application user; and/or any other data that can be used to contact the application user by the preferred method indicated by the application user, as discussed herein, and/or as known in the art at the time of filing, and/or as developed/made available after the time of filing.

In one embodiment, once the application user provides contact data associated with the application user at OBTAIN APPLICATION USER CONTACT DATA FROM AN APPLICATION USER OPERATION 203, process flow proceeds to ASSIGN APPLICATION USER IDENTIFICATION DATA TO THE APPLICATION USER OPERATION 205.

In one embodiment, once the application user provides application user contact data and is registered with the application provider at OBTAIN APPLICATION USER CONTACT DATA FROM AN APPLICATION USER OPERATION 203, at ASSIGN APPLICATION USER IDENTIFICATION DATA TO THE APPLICATION USER OPERATION 205, unique application user identification data is assigned to the application user, and/or an account/file is created for the application user that includes, and/or is identified by, the application user identification data.

As discussed below, in one embodiment, the application user identification data is included with each application request submitted by the application user so that, if an error occurs, the application user can be identified and associated with the error data.

In one embodiment, once unique application user identification data is assigned to the application user, and/or an account/file is created for the application user that includes, and/or is identified by, the application user identification data at ASSIGN APPLICATION USER IDENTIFICATION DATA TO THE APPLICATION USER OPERATION 205, process flow proceeds to RECEIVE APPLICATION REQUEST DATA ASSOCIATED WITH THE APPLICATION USER OPERATION 207.

In one embodiment, at RECEIVE APPLICATION REQUEST DATA ASSOCIATED WITH THE APPLICATION USER OPERATION 207 application request data is received from the application user, or more specifically, a computing system associated with the application user.

In various embodiments, the application request data of RECEIVE APPLICATION REQUEST DATA ASSOCIATED WITH THE APPLICATION USER OPERATION 207 represents a request by the application user to either access the application, or to access, and/or use, various features and/or functionality associated with the application, and/or generated by the application.

In one embodiment, once application request data is received from the application user, or more specifically, a computing system associated with the application user, at RECEIVE APPLICATION REQUEST DATA ASSOCIATED WITH THE APPLICATION USER OPERATION 207, process flow proceeds to ASSIGN REQUEST IDENTIFICATION DATA TO THE APPLICATION REQUEST DATA OPERATION 209.

In one embodiment, at ASSIGN REQUEST IDENTIFICATION DATA TO THE APPLICATION REQUEST DATA OPERATION 209 request identification data is generated and assigned to the application request data of RECEIVE APPLICATION REQUEST DATA ASSOCIATED WITH THE APPLICATION USER OPERATION 207.

As discussed below, in the event of an error, the request identification data is used to uniquely identify the application request that resulted in the error. Consequently, in one embodiment, the application request data includes, and/or is associated with, both the application user identification data, identifying the application user, and request identification data, identifying the specific application request.

In one embodiment, once request identification data is generated and assigned to the application request data of RECEIVE APPLICATION REQUEST DATA ASSOCIATED WITH THE APPLICATION USER OPERATION 207 at ASSIGN REQUEST IDENTIFICATION DATA TO THE APPLICATION REQUEST DATA OPERATION 209, process flow proceeds to ASSOCIATE THE APPLICATION USER IDENTIFICATION DATA AND THE REQUEST IDENTIFICATION DATA WITH THE APPLICATION REQUEST DATA OPERATION 211.

In one embodiment, at ASSOCIATE THE APPLICATION USER IDENTIFICATION DATA AND THE REQUEST IDENTIFICATION DATA WITH THE APPLICATION REQUEST DATA OPERATION 211 the application request data of RECEIVE APPLICATION REQUEST DATA ASSOCIATED WITH THE APPLICATION USER OPERATION 207, the application user identification data of ASSIGN APPLICATION USER IDENTIFICATION DATA TO THE APPLICATION USER OPERATION 205, and the request identification data of ASSIGN REQUEST IDENTIFICATION DATA TO THE APPLICATION REQUEST DATA OPERATION 209, are correlated, mapped, and/or stored.

In one embodiment, at ASSOCIATE THE APPLICATION USER IDENTIFICATION DATA AND THE REQUEST IDENTIFICATION DATA WITH THE APPLICATION REQUEST DATA OPERATION 211 the application request data, application user identification data, and request identification data, are correlated, mapped, and/or stored in an application request log.

In one embodiment, at ASSOCIATE THE APPLICATION USER IDENTIFICATION DATA AND THE REQUEST IDENTIFICATION DATA WITH THE APPLICATION REQUEST DATA OPERATION 211 the application request data, application user identification data, and request identification data, are processed and managed using an application request processing and management system, such as a designated computing system, and/or portion of a computing system.

In one embodiment, once the application request data of RECEIVE APPLICATION REQUEST DATA ASSOCIATED WITH THE APPLICATION USER OPERATION 207, the application user identification data of ASSIGN APPLICATION USER IDENTIFICATION DATA TO THE APPLICATION USER OPERATION 205, and the request identification data of ASSIGN REQUEST IDENTIFICATION DATA TO THE APPLICATION REQUEST DATA OPERATION 209, are correlated, mapped, and/or stored at ASSOCIATE THE APPLICATION USER IDENTIFICATION DATA AND THE REQUEST IDENTIFICATION DATA WITH THE APPLICATION REQUEST DATA OPERATION 211, process flow proceeds to OBTAIN ERROR DATA ASSOCIATED WITH THE APPLICATION REQUEST DATA INDICATING AN ERROR HAS OCCURRED OPERATION 213.

In one embodiment, at OBTAIN ERROR DATA ASSOCIATED WITH THE APPLICATION REQUEST DATA INDICATING AN ERROR HAS OCCURRED OPERATION 213 an error occurs while the application function associated with the application request data of RECEIVE APPLICATION REQUEST DATA ASSOCIATED WITH THE APPLICATION USER OPERATION 207 is being performed and error data associated with the application request data indicating an error has occurred is generated and received.

In one embodiment, at OBTAIN ERROR DATA ASSOCIATED WITH THE APPLICATION REQUEST DATA INDICATING AN ERROR HAS OCCURRED OPERATION 213 the error data is received from the application, and/or the application provider, based on one or more identified error conditions being associated with the operation being performed in response to the application request data of RECEIVE APPLICATION REQUEST DATA ASSOCIATED WITH THE APPLICATION USER OPERATION 207. In one embodiment, the error data is received at OBTAIN ERROR DATA ASSOCIATED WITH THE APPLICATION REQUEST DATA INDICATING AN ERROR HAS OCCURRED OPERATION 213 as, and/or in association with, one or more predetermined error messages.

In one embodiment, at OBTAIN ERROR DATA ASSOCIATED WITH THE APPLICATION REQUEST DATA INDICATING AN ERROR HAS OCCURRED OPERATION 213 the error data is received from an application language exception.

In one embodiment, at OBTAIN ERROR DATA ASSOCIATED WITH THE APPLICATION REQUEST DATA INDICATING AN ERROR HAS OCCURRED OPERATION 213 the error data is received from an operating system signal.

In one embodiment, at OBTAIN ERROR DATA ASSOCIATED WITH THE APPLICATION REQUEST DATA INDICATING AN ERROR HAS OCCURRED OPERATION 213 the error data is received from one or more computing systems associated with the application user, and used to access the application and submit the application request data of RECEIVE APPLICATION REQUEST DATA ASSOCIATED WITH THE APPLICATION USER OPERATION 207. In various embodiments, the error data is generated at OBTAIN ERROR DATA ASSOCIATED WITH THE APPLICATION REQUEST DATA INDICATING AN ERROR HAS OCCURRED OPERATION 213 in response to monitoring the operation of the implementation of the application used by the application user and the identification of an error occurring such as, but not limited to, a display lockup, a blue screen event, more than a threshold level of idle time, i.e., more than a threshold period of inactivity, and/or any other indication that an error has occurred in the implementation of the application, as discussed herein, and/or as known in the art at the time of filing, and/or as developed/made available after the time of filing.

In one embodiment, once an error occurs while the application function associated with the application request data of RECEIVE APPLICATION REQUEST DATA ASSOCIATED WITH THE APPLICATION USER OPERATION 207 is being performed and error data associated with the application request data indicating an error has occurred is generated and received at OBTAIN ERROR DATA ASSOCIATED WITH THE APPLICATION REQUEST DATA INDICATING AN ERROR HAS OCCURRED OPERATION 213, process flow proceeds to DESIGNATE AN ERROR REPAIR STATUS DATA LOCATION FOR STORING ERROR REPAIR STATUS DATA ASSOCIATED WITH THE REPAIR OF THE ERROR ASSOCIATED WITH THE ERROR DATA OPERATION 215.

In one embodiment, once error data is received at OBTAIN ERROR DATA ASSOCIATED WITH THE APPLICATION REQUEST DATA INDICATING AN ERROR HAS OCCURRED OPERATION 213, an error repair status data location is automatically generated and/or designated at DESIGNATE AN ERROR REPAIR STATUS DATA LOCATION FOR STORING ERROR REPAIR STATUS DATA ASSOCIATED WITH THE REPAIR OF THE ERROR ASSOCIATED WITH THE ERROR DATA OPERATION 215.

In various embodiments, the error repair status data location of DESIGNATE AN ERROR REPAIR STATUS DATA LOCATION FOR STORING ERROR REPAIR STATUS DATA ASSOCIATED WITH THE REPAIR OF THE ERROR ASSOCIATED WITH THE ERROR DATA OPERATION 215 can be, but is not limited to, one or more of, a location in a memory or other data store/database where error repair status data associated with the error will be located/stored/displayed, and/or updated; a location or account in a memory or other data store/database, where error repair status data will be located/stored, and/or updated; a website, or other network-based location, where error repair status data will be located/stored/displayed, and/or updated; and/or any other data store or database, or other means, mechanism, process, or procedure through which error repair status data can be stored, displayed, updated, and/or accessed by one or more parties.

In one embodiment, once an error repair status data location is automatically generated and/or designated at DESIGNATE AN ERROR REPAIR STATUS DATA LOCATION FOR STORING ERROR REPAIR STATUS DATA ASSOCIATED WITH THE REPAIR OF THE ERROR ASSOCIATED WITH THE ERROR DATA OPERATION 215, process flow proceeds to PROVIDE ERROR REPAIR STATUS DATA ASSOCIATED WITH THE ERROR TO THE ERROR REPAIR STATUS DATA LOCATION OPERATION 217.

In one embodiment, once an error repair status data location is generated and/or designated at DESIGNATE AN ERROR REPAIR STATUS DATA LOCATION FOR STORING ERROR REPAIR STATUS DATA ASSOCIATED WITH THE REPAIR OF THE ERROR ASSOCIATED WITH THE ERROR DATA OPERATION 215, error repair status data is obtained from one or more modules, systems, and/or parties, indicating the steps being taken to correct the error associated with the error data and the error repair status data is automatically transferred to the error repair status data location at PROVIDE ERROR REPAIR STATUS DATA ASSOCIATED WITH THE ERROR TO THE ERROR REPAIR STATUS DATA LOCATION OPERATION 217.

In addition, in one embodiment, at PROVIDE ERROR REPAIR STATUS DATA ASSOCIATED WITH THE ERROR TO THE ERROR REPAIR STATUS DATA LOCATION OPERATION 217 the error repair status data in the error repair status data location of DESIGNATE AN ERROR REPAIR STATUS DATA LOCATION FOR STORING ERROR REPAIR STATUS DATA ASSOCIATED WITH THE REPAIR OF THE ERROR ASSOCIATED WITH THE ERROR DATA OPERATION 215 is updated on a periodic basis, and/or as the status of the error repair changes.

In one embodiment, once error repair status data is obtained from one or more modules, systems, and/or parties, indicating the steps being taken to correct the error associated with the error data and the error repair status data is automatically transferred to the error repair status data location at PROVIDE ERROR REPAIR STATUS DATA ASSOCIATED WITH THE ERROR TO THE ERROR REPAIR STATUS DATA LOCATION OPERATION 217, process flow proceeds to GENERATE APPLICATION USER ERROR NOTIFICATION DATA INCLUDING ERROR REPAIR STATUS ACCESS DATA OPERATION 219.

In one embodiment, once error data is received at PROVIDE ERROR REPAIR STATUS DATA ASSOCIATED WITH THE ERROR TO THE ERROR REPAIR STATUS DATA LOCATION OPERATION 217, at GENERATE APPLICATION USER ERROR NOTIFICATION DATA INCLUDING ERROR REPAIR STATUS ACCESS DATA OPERATION 219 the application user identification data of ASSIGN APPLICATION USER IDENTIFICATION DATA TO THE APPLICATION USER OPERATION 205 and the request identification data of ASSIGN REQUEST IDENTIFICATION DATA TO THE APPLICATION REQUEST DATA OPERATION 209 associated with the application request data of RECEIVE APPLICATION REQUEST DATA ASSOCIATED WITH THE APPLICATION USER OPERATION 207 that resulted in the error of OBTAIN ERROR DATA ASSOCIATED WITH THE APPLICATION REQUEST DATA INDICATING AN ERROR HAS OCCURRED OPERATION 213 is used to generate application user error notification data to be provided to the application user.

In various embodiments, the application user error notification data of at GENERATE APPLICATION USER ERROR NOTIFICATION DATA INCLUDING ERROR REPAIR STATUS ACCESS DATA OPERATION 219 includes error repair status access data representing data necessary for accessing the designated error repair status data location of DESIGNATE AN ERROR REPAIR STATUS DATA LOCATION FOR STORING ERROR REPAIR STATUS DATA ASSOCIATED WITH THE REPAIR OF THE ERROR ASSOCIATED WITH THE ERROR DATA OPERATION 215 and the error repair status data associated with the error.

In one embodiment, once the application user identification data of ASSIGN APPLICATION USER IDENTIFICATION DATA TO THE APPLICATION USER OPERATION 205 and the request identification data of ASSIGN REQUEST IDENTIFICATION DATA TO THE APPLICATION REQUEST DATA OPERATION 209 associated with the application request data of RECEIVE APPLICATION REQUEST DATA ASSOCIATED WITH THE APPLICATION USER OPERATION 207 that resulted in the error of OBTAIN ERROR DATA ASSOCIATED WITH THE APPLICATION REQUEST DATA INDICATING AN ERROR HAS OCCURRED OPERATION 213 is used to generate application user error notification data to be provided to the application user at GENERATE APPLICATION USER ERROR NOTIFICATION DATA INCLUDING ERROR REPAIR STATUS ACCESS DATA OPERATION 219, process flow proceeds to PROVIDE THE APPLICATION USER ERROR NOTIFICATION DATA, INCLUDING THE ERROR REPAIR STATUS ACCESS DATA, TO THE APPLICATION USER OPERATION 221.

In one embodiment, at PROVIDE THE APPLICATION USER ERROR NOTIFICATION DATA, INCLUDING THE ERROR REPAIR STATUS ACCESS DATA, TO THE APPLICATION USER OPERATION 221 the application user error notification data of GENERATE APPLICATION USER ERROR NOTIFICATION DATA INCLUDING ERROR REPAIR STATUS ACCESS DATA OPERATION 219, including the error repair status access data, is provided to the application user using the provided application user contact data of OBTAIN APPLICATION USER CONTACT DATA FROM AN APPLICATION USER OPERATION 203.

In one embodiment, the application user is thereby provided access to the error repair status data and all updates to the error repair status data at PROVIDE THE APPLICATION USER ERROR NOTIFICATION DATA, INCLUDING THE ERROR REPAIR STATUS ACCESS DATA, TO THE APPLICATION USER OPERATION 221 so that the application user can not only be assured that the error is being addressed, but the application user can see the progress made in correcting the error.

In addition, in one embodiment, at PROVIDE THE APPLICATION USER ERROR NOTIFICATION DATA, INCLUDING THE ERROR REPAIR STATUS ACCESS DATA, TO THE APPLICATION USER OPERATION 221 the error repair status data in the error repair status data location also includes data indicating what step, or steps, the application user should take to either correct the error on their own, or should be taken once the error has been repaired.

In one embodiment, once the application user error notification data of GENERATE APPLICATION USER ERROR NOTIFICATION DATA INCLUDING ERROR REPAIR STATUS ACCESS DATA OPERATION 219, including the error repair status access data, is provided to the application user using the provided application user contact data of OBTAIN APPLICATION USER CONTACT DATA FROM AN APPLICATION USER OPERATION 203 at PROVIDE THE APPLICATION USER ERROR NOTIFICATION DATA, INCLUDING THE ERROR REPAIR STATUS ACCESS DATA, TO THE APPLICATION USER OPERATION 221, process flow proceeds to EXIT OPERATION 230.

In one embodiment, at EXIT OPERATION 230, process 200 for providing error repair status data to an application user is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using the process 200 for providing error repair status data to an application user discussed above, an application user is provided access to data indicating the status of the efforts to repair an error that has occurred in the application implementation. In addition, in one embodiment, the application user is also informed of the best next step to take to either repair or circumvent the error in the application instance, or what action to take once the error has been repaired by the application provider.

In accordance with one embodiment, when an application user registers, or otherwise signs up, to use an application offered through an application provider, application user contact data associated with the application user is obtained indicating how to contact the application user and access/account data necessary to do so. In one embodiment, application user identification data is assigned to the application user.

In one embodiment, application request data associated with the application user requesting access to the application, and/or a feature/operation associated with the application, and/or data associated with the application, is received. In one embodiment, request identification data is assigned to the application request data. The application user identification data and the request identification data are then associated with the application request data.

In one embodiment, if, and when, error data associated with the application request data indicating an error has occurred is received, application user error notification data including error repair status data associated with the repair of the error associated with the error data is generated. In one embodiment, the application user error notification data, including the error repair status data associated with the repair of the error associated with the error data, is then provided to the application user, thereby providing the application user updated error repair status data automatically.

Figure 3:
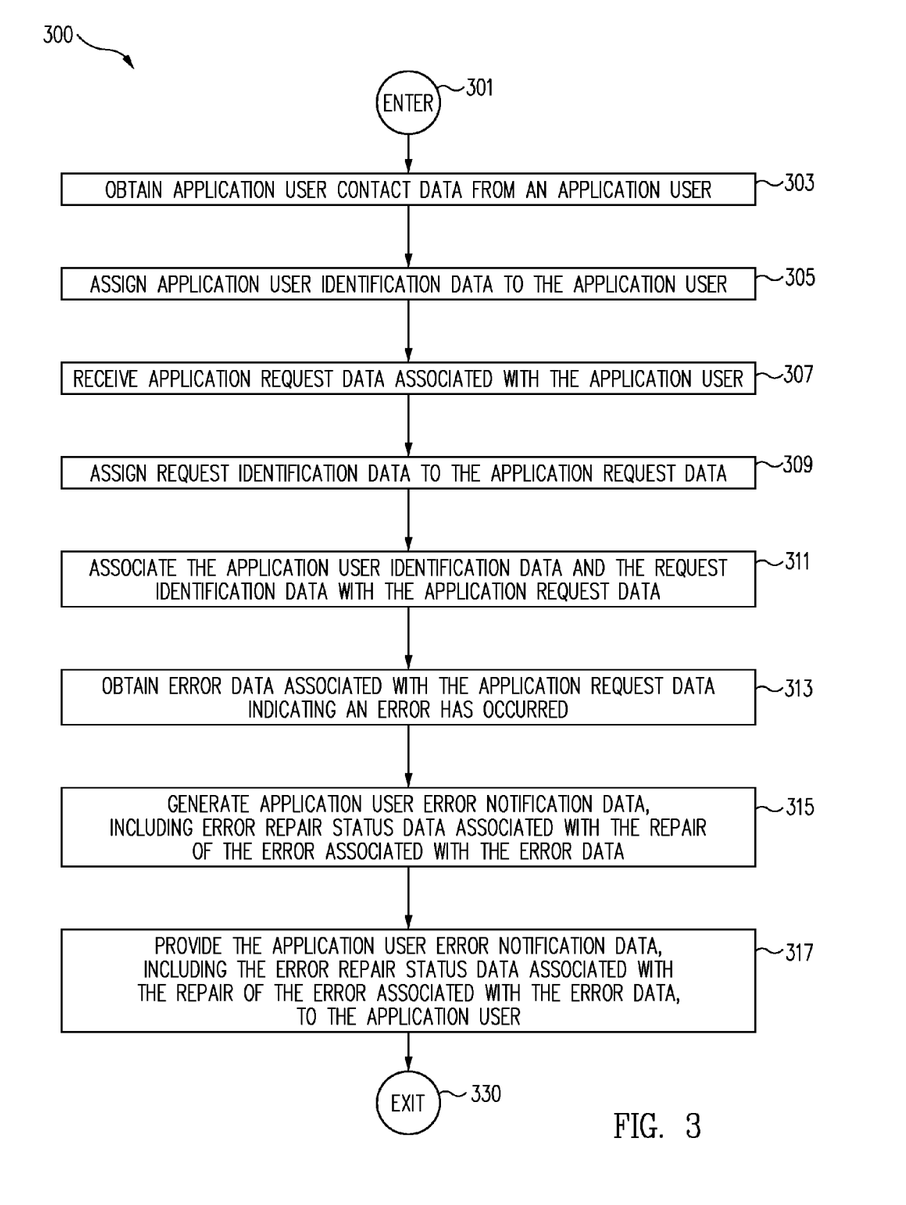
FIG. 3 is a flow chart depicting a process for providing error repair status data to an application user in accordance with one embodiment.

FIG. 3 is a flow chart depicting a process 300 for providing error repair status data to an application user in accordance with one embodiment.

Process 300 for providing error repair status data to an application user begins at ENTER OPERATION 301 of FIG. 3 and process flow proceeds to process flow proceeds to OBTAIN APPLICATION USER CONTACT DATA FROM AN APPLICATION USER OPERATION 303.

In accordance with one embodiment, one or more data applications are provided by an application provider. In various embodiments, an application provider provides access to an application through one or more mechanisms, processes, and/or procedures, including via the Internet, and/or any "cloud-based" architecture, and/or one or more remote application servers, databases, and/or other computing systems.

In various embodiments, the one or more applications are any software applications as discussed herein, and/or as known in the art at the time of filing, and/or as developed after the time of filing, through which a remote application user can provide data, access data, request specific processing, and/or otherwise implement an instance of the application for business or personal use by the application user, and/or one or more agents acting on behalf of the application user.

In one embodiment, at the time the application user signs up for, or otherwise registers with, the application and/or the application provider, the application user is provided the opportunity to take part in, i.e. opt into, process 300 for providing error repair status data to an application user.

In one embodiment, at OBTAIN APPLICATION USER CONTACT DATA FROM AN APPLICATION USER OPERATION 303 as part of the registration process the application user is asked to provide contact data associated with the application user.

In various embodiments, the contact data associated with the application user of OBTAIN APPLICATION USER CONTACT DATA FROM AN APPLICATION USER OPERATION 303 includes, but is not limited to, one or more of the following, an email address associated with the application user; a telephone number associated with the application user; a telephone number for receiving text messages associated with the application user; social media access data account associated with the application user; and/or any other data that can be used to contact the application user by the preferred method indicated by the application user, as discussed herein, and/or as known in the art at the time of filing, and/or as developed/made available after the time of filing.

In one embodiment, once the application user provides contact data associated with the application user at OBTAIN APPLICATION USER CONTACT DATA FROM AN APPLICATION USER OPERATION 303, process flow proceeds to ASSIGN APPLICATION USER IDENTIFICATION DATA TO THE APPLICATION USER OPERATION 305.

In one embodiment, once the application user provides application user contact data and is registered with the application provider at OBTAIN APPLICATION USER CONTACT DATA FROM AN APPLICATION USER OPERATION 303, at ASSIGN APPLICATION USER IDENTIFICATION DATA TO THE APPLICATION USER OPERATION 305, unique application user identification data is assigned to the application user, and/or an account/file is created for the application user that includes, and/or is identified by, the application user identification data.

As discussed below, in one embodiment, the application user identification data is included with each application request submitted by the application user so that, if an error occurs, the application user can be identified and associated with the error data.

In one embodiment, once unique application user identification data is assigned to the application user, and/or an account/file is created for the application user that includes, and/or is identified by, the application user identification data at ASSIGN APPLICATION USER IDENTIFICATION DATA TO THE APPLICATION USER OPERATION 305, process flow proceeds to RECEIVE APPLICATION REQUEST DATA ASSOCIATED WITH THE APPLICATION USER OPERATION 307.

In one embodiment, at RECEIVE APPLICATION REQUEST DATA ASSOCIATED WITH THE APPLICA- TION USER OPERATION 307 application request data is received from the application user, or more specifically, a computing system associated with the application user.

In various embodiments, the application request data of RECEIVE APPLICATION REQUEST DATA ASSOCIATED WITH THE APPLICATION USER OPERATION 307 represents a request by the application user to either access the application, or to access, and/or use, various features and/or functionality associated with the application, and/or generated by the application.

In one embodiment, once application request data is received from the application user, or more specifically, a computing system associated with the application user, at RECEIVE APPLICATION REQUEST DATA ASSOCIATED WITH THE APPLICATION USER OPERATION 307, process flow proceeds to ASSIGN REQUEST IDENTIFICATION DATA TO THE APPLICATION REQUEST DATA OPERATION 309.

In one embodiment, at ASSIGN REQUEST IDENTIFICATION DATA TO THE APPLICATION REQUEST DATA OPERATION 309 request identification data is generated and assigned to the application request data of RECEIVE APPLICATION REQUEST DATA ASSOCIATED WITH THE APPLICATION USER OPERATION 307.

As discussed below, in the event of an error, the request identification data is used to uniquely identify the application request that resulted in the error. Consequently, in one embodiment, the application request data includes, and/or is associated with, both the application user identification data, identifying the application user, and request identification data, identifying the specific application request.

In one embodiment, once request identification data is generated and assigned to the application request data of RECEIVE APPLICATION REQUEST DATA ASSOCIATED WITH THE APPLICATION USER OPERATION 307 at ASSIGN REQUEST IDENTIFICATION DATA TO THE APPLICATION REQUEST DATA OPERATION 309, process flow proceeds to ASSOCIATE THE APPLICATION USER IDENTIFICATION DATA AND THE REQUEST IDENTIFICATION DATA WITH THE APPLICATION REQUEST DATA OPERATION 311.

In one embodiment, at ASSOCIATE THE APPLICATION USER IDENTIFICATION DATA AND THE REQUEST IDENTIFICATION DATA WITH THE APPLICATION REQUEST DATA OPERATION 311 the application request data of RECEIVE APPLICATION REQUEST DATA ASSOCIATED WITH THE APPLICATION USER OPERATION 307, the application user identification data of ASSIGN APPLICATION USER IDENTIFICATION DATA TO THE APPLICATION USER OPERATION 305, and the request identification data of ASSIGN REQUEST IDENTIFICATION DATA TO THE APPLICATION REQUEST DATA OPERATION 309, are correlated, mapped, and/or stored.

In one embodiment, at ASSOCIATE THE APPLICATION USER IDENTIFICATION DATA AND THE REQUEST IDENTIFICATION DATA WITH THE APPLICATION REQUEST DATA OPERATION 311 the application request data, application user identification data, and request identification data, are correlated, mapped, and/or stored in an application request log.

In one embodiment, at ASSOCIATE THE APPLICATION USER IDENTIFICATION DATA AND THE REQUEST IDENTIFICATION DATA WITH THE APPLICATION REQUEST DATA OPERATION 311 the application request data, application user identification data, and request identification data, are processed and managed using an application request processing and management system, such as a designated computing system, and/or portion of a computing system.

In one embodiment, once the application request data of RECEIVE APPLICATION REQUEST DATA ASSOCIATED WITH THE APPLICATION USER OPERATION 307, the application user identification data of ASSIGN APPLICATION USER IDENTIFICATION DATA TO THE APPLICATION USER OPERATION 305, and the request identification data of ASSIGN REQUEST IDENTIFICATION DATA TO THE APPLICATION REQUEST DATA OPERATION 309, are correlated, mapped, and/or stored at ASSOCIATE THE APPLICATION USER IDENTIFICATION DATA AND THE REQUEST IDENTIFICATION DATA WITH THE APPLICATION REQUEST DATA OPERATION 311, process flow proceeds to OBTAIN ERROR DATA ASSOCIATED WITH THE APPLICATION REQUEST DATA INDICATING AN ERROR HAS OCCURRED OPERATION 313.

In one embodiment, at OBTAIN ERROR DATA ASSOCIATED WITH THE APPLICATION REQUEST DATA INDICATING AN ERROR HAS OCCURRED OPERATION 313 an error occurs while the application function associated with the application request data of RECEIVE APPLICATION REQUEST DATA ASSOCIATED WITH THE APPLICATION USER OPERATION 307 is being performed and error data associated with the application request data indicating an error has occurred is generated and received.

In one embodiment, at OBTAIN ERROR DATA ASSOCIATED WITH THE APPLICATION REQUEST DATA INDICATING AN ERROR HAS OCCURRED OPERATION 313 the error data is received from the application, and/or the application provider, based on one or more identified error conditions being associated with the operation being performed in response to the application request data. In one embodiment, the error data is received at OBTAIN ERROR DATA ASSOCIATED WITH THE APPLICATION REQUEST DATA INDICATING AN ERROR HAS OCCURRED OPERATION 313 as, and/or in association with, one or more predetermined error messages.

In one embodiment, at OBTAIN ERROR DATA ASSOCIATED WITH THE APPLICATION REQUEST DATA INDICATING AN ERROR HAS OCCURRED OPERATION 313 the error data is received from an application language exception.

In one embodiment, at OBTAIN ERROR DATA ASSOCIATED WITH THE APPLICATION REQUEST DATA INDICATING AN ERROR HAS OCCURRED OPERATION 313 the error data is received from an operating system signal.

In one embodiment, at OBTAIN ERROR DATA ASSOCIATED WITH THE APPLICATION REQUEST DATA INDICATING AN ERROR HAS OCCURRED OPERATION 313 the error data is received from one or more computing systems associated with the application user, and used to access the application and submit the application request data. In various embodiments, the error data is generated at OBTAIN ERROR DATA ASSOCIATED WITH THE APPLICATION REQUEST DATA INDICATING AN ERROR HAS OCCURRED OPERATION 313 in response to monitoring the operation of the implementation of the application used by the application user and the identification of an error occurring such as, but not limited to, a display lockup, a blue screen event, more than a threshold level of idle time, i.e., more than a threshold period of inactivity, and/or any other indication that an error has occurred in the implementation of the application, as discussed herein, and/or as known in the art at the time of filing, and/or as developed/made available after the time of filing.

In one embodiment, once an error occurs while the application function associated with the application request data of RECEIVE APPLICATION REQUEST DATA ASSOCIATED WITH THE APPLICATION USER OPERATION 307 is being performed and error data associated with the application request data indicating an error has occurred is generated and received at OBTAIN ERROR DATA ASSOCIATED WITH THE APPLICATION REQUEST DATA INDICATING AN ERROR HAS OCCURRED OPERATION 313, process flow proceeds to GENERATE APPLICATION USER ERROR NOTIFICATION DATA, INCLUDING ERROR REPAIR STATUS DATA ASSOCIATED WITH THE REPAIR OF THE ERROR ASSOCIATED WITH THE ERROR DATA OPERATION 315.

In one embodiment, once error data is received OBTAIN ERROR DATA ASSOCIATED WITH THE APPLICATION REQUEST DATA INDICATING AN ERROR HAS OCCURRED OPERATION 313, application user error notification data is generated at GENERATE APPLICATION USER ERROR NOTIFICATION DATA, INCLUDING ERROR REPAIR STATUS DATA ASSOCIATED WITH THE REPAIR OF THE ERROR ASSOCIATED WITH THE ERROR DATA OPERATION 315.

In one embodiment, the application user error notification data of GENERATE APPLICATION USER ERROR NOTIFICATION DATA, INCLUDING ERROR REPAIR STATUS DATA ASSOCIATED WITH THE REPAIR OF THE ERROR ASSOCIATED WITH THE ERROR DATA OPERATION 315 includes error repair status data associated with the repair of the error and indicating the status of the repair operations associated with the error data.

In one embodiment, once application user error notification data is generated at GENERATE APPLICATION USER ERROR NOTIFICATION DATA, INCLUDING ERROR REPAIR STATUS DATA ASSOCIATED WITH THE REPAIR OF THE ERROR ASSOCIATED WITH THE ERROR DATA OPERATION 315, process flow proceeds to PROVIDE THE APPLICATION USER ERROR NOTIFICATION DATA, INCLUDING THE ERROR REPAIR STATUS DATA ASSOCIATED WITH THE REPAIR OF THE ERROR ASSOCIATED WITH THE ERROR DATA, TO THE APPLICATION USER OPERATION 317.

In one embodiment, at PROVIDE THE APPLICATION USER ERROR NOTIFICATION DATA, INCLUDING THE ERROR REPAIR STATUS DATA ASSOCIATED WITH THE REPAIR OF THE ERROR ASSOCIATED WITH THE ERROR DATA, TO THE APPLICATION USER OPERATION 317 the application user error notification data of GENERATE APPLICATION USER ERROR NOTIFICATION DATA, INCLUDING ERROR REPAIR STATUS DATA ASSOCIATED WITH THE REPAIR OF THE ERROR ASSOCIATED WITH THE ERROR DATA OPERATION 315, including the error repair status data associated with the repair of the error associated with the error data, is provided to the application user using the application user contact data of OBTAIN APPLICATION USER CONTACT DATA FROM AN APPLICATION USER OPERATION 303 obtained from the application user at the time the application user registered with the application provider and/or signed up for process 300 for providing error repair status data to an application user.

In addition, as the status of the error repair changes, i.e., as the error repair status data changes, additional/new application user error notification data, including the updated error repair status data, is generated and provided to the application user at PROVIDE THE APPLICATION USER ERROR NOTIFICATION DATA, INCLUDING THE ERROR REPAIR STATUS DATA ASSOCIATED WITH THE REPAIR OF THE ERROR ASSOCIATED WITH THE ERROR DATA, TO THE APPLICATION USER OPERATION 317 using the application user contact data.

Consequently, at PROVIDE THE APPLICATION USER ERROR NOTIFICATION DATA, INCLUDING THE ERROR REPAIR STATUS DATA ASSOCIATED WITH THE REPAIR OF THE ERROR ASSOCIATED WITH THE ERROR DATA, TO THE APPLICATION USER OPERATION 317 the application user is provided initial application user error notification data and updated error repair status data automatically and on a periodic, and/or status change, basis.

In addition, in one embodiment, the error repair status data of at PROVIDE THE APPLICATION USER ERROR NOTIFICATION DATA, INCLUDING THE ERROR REPAIR STATUS DATA ASSOCIATED WITH THE REPAIR OF THE ERROR ASSOCIATED WITH THE ERROR DATA, TO THE APPLICATION USER OPERATION 317 also includes data indicating what step, or steps, the application user should take to either correct the error on their own, or should be taken once the error has been repaired.

In one embodiment, once the application user error notification data of GENERATE APPLICATION USER ERROR NOTIFICATION DATA, INCLUDING ERROR REPAIR STATUS DATA ASSOCIATED WITH THE REPAIR OF THE ERROR ASSOCIATED WITH THE ERROR DATA OPERATION 315, including the error repair status data associated with the repair of the error associated with the error data, is provided to the application user using the application user contact data of OBTAIN APPLICATION USER CONTACT DATA FROM AN APPLICATION USER OPERATION 303 obtained from the application user at the time the application user registered with the application provider and/or signed up for process 300 for providing error repair status data to an application user at PROVIDE THE APPLICATION USER ERROR NOTIFICATION DATA, INCLUDING THE ERROR REPAIR STATUS DATA ASSOCIATED WITH THE REPAIR OF THE ERROR ASSOCIATED WITH THE ERROR DATA, TO THE APPLICATION USER OPERATION 317, process flow proceeds to EXIT OPERATION 330.

In one embodiment, at EXIT OPERATION 330, process 300 for providing error repair status data to an application user is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using the process 300 for providing error repair status data to an application user discussed above, an application user is provided data indicating the status of the efforts to repair an error that has occurred in an application implementation. In addition, in one embodiment, the application user is also informed of the best next step to take to either repair or circumvent the error in the application instance, or what action to take once the error has been repaired by the application provider.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for providing error repair status data to an application user comprising the following, which when executed individually or collectively by any set of one or more processors perform a process including:
    obtaining application user contact data from an application user;
    assigning application user identification data to the application user;
    receiving application request data associated with the application user;
    assigning request identification data to the application request data;
    associating the application user identification data and the request identification data with the application request data;
    obtaining error data associated with the application request data indicating an error has occurred;
    designating an error repair status data location for storing error repair status data associated with the repair of the error associated with the error data;

providing error repair status data associated with the error to the error repair status data location, the provided error repair status data being updated as a threshold level of progress is made towards fixing the error;

generating application user error notification data, the application user error notification data including error repair status access data representing data for accessing error repair status data associated with the error;

providing the application user error notification data, including the error repair status access data, to the application user.

2. The computing system implemented method for providing error repair status data to an application user of claim 1 wherein the application user contact data for the application user includes e-mail contact data associated with the application user.

3. The computing system implemented method for providing error repair status data to an application user of claim 2 wherein the application user error notification data, including the error repair status access data, is provided to the user using the provided e-mail contact data.

4. The computing system implemented method for providing error repair status data to an application user of claim 1 wherein the application user contact data for the application user includes text message contact data associated with the application user.

5. The computing system implemented method for providing error repair status data to an application user of claim 4 wherein the application user error notification data, including the error repair status access data, is provided to the user using the provided text message contact data.

6. The computing system implemented method for providing error repair status data to an application user of claim 1 wherein the error data associated with the application request data is received from the application.

7. The computing system implemented method for providing error repair status data to an application user of claim 1 wherein the error data associated with the application request data is received from a computing system associated with the application user.

8. The computing system implemented method for providing error repair status data to an application user of claim 1 wherein the application user error notification data, including the error repair status access data, is provided to the user through an error message sent to a computing system associated with the application user.

9. The computing system implemented method for providing error repair status data to an application user of claim 1 wherein the error repair status access data included in the application user error notification data includes data required to access an error repair database where the error repair status data is maintained.

10. The computing system implemented method for providing error repair status data to an application user of claim 1 wherein the error repair status access data included in the application user error notification data includes URL data linking to a network location where the error repair status data is maintained and displayed.

11. A system for providing error repair status data to an application user comprising:
at least one processor; and
at least one memory coupled to the at least one processor, the at least one memory having stored therein instructions which when executed by any set of the one or more processors, perform a process for providing error repair status data to an application user, the process for providing error repair status data to an application user including:

obtaining application user contact data from an application user;

assigning application user identification data to the application user;

receiving application request data associated with the application user;

assigning request identification data to the application request data;

associating the application user identification data and the request identification data with the application request data;

obtaining error data associated with the application request data indicating an error has occurred;

designating an error repair status data location for storing error repair status data associated with the repair of the error associated with the error data;

providing error repair status data associated with the error to the error repair status data location, the provided error repair status data being updated as a threshold level of progress is made towards fixing the error;

generating application user error notification data, the application user error notification data including error repair status access data representing data for accessing error repair status data associated with the error;

providing the application user error notification data, including the error repair status access data, to the application user.

12. The system for providing error repair status data to an application user of claim 11 wherein the application user contact data for the application user includes e-mail contact data associated with the application user.

13. The system for providing error repair status data to an application user of claim 12 wherein the application user error notification data, including the error repair status access data, is provided to the user using the provided e-mail contact data.

14. The system for providing error repair status data to an application user of claim 11 wherein the application user contact data for the application user includes text message contact data associated with the application user.

15. The system for providing error repair status data to an application user of claim 14 wherein the application user error notification data, including the error repair status access data, is provided to the user using the provided text message contact data.

16. The system for providing error repair status data to an application user of claim 11 wherein the error data associated with the application request data is received from the application.

17. The system for providing error repair status data to an application user of claim 11 wherein the error data associated with the application request data is received from a computing system associated with the application user.

18. The system for providing error repair status data to an application user of claim 11 wherein the application user error notification data, including the error repair status access data, is provided to the user through an error message sent to a computing system associated with the application user.

19. The system for providing error repair status data to an application user of claim 11 wherein the error repair status access data included in the application user error notification data includes data required to access an error repair database where the error repair status data is maintained.

20. The system for providing error repair status data to an application user of claim 11 wherein the error repair status access data included in the application user error notification data includes URL data linking to a network location where the error repair status data is maintained and displayed.

21. A system for providing error repair status data to an application user comprising:

at least one processor; and at least one memory coupled to the at least one processor, the at least one memory having stored therein instructions which when executed by any set of the one or more processors, perform a process for providing error repair status data to an application user, the process for providing error repair status data to an application user including:

obtaining application user contact data from an application user;

assigning application user identification data to the application user;

receiving application request data associated with the application user;

assigning request identification data to the application request data;

associating the application user identification data and the request identification data with the application request data;

obtaining error data associated with the application request data indicating an error has occurred;

generating application user error notification data, the application user error notification data including error repair status data associated with the repair of the error associated with the error data, the error repair status data being updated as a threshold level of progress is made towards fixing the error;

providing the application user error notification data, including the error repair status data associated with the repair of the error associated with the error data, to the application user.

22. The system for providing error repair status data to an application user of claim 21 wherein the application user contact data for the application user includes e-mail contact data associated with the application user.

23. The system for providing error repair status data to an application user of claim 22 wherein the application user error notification data, including the error repair status data associated with the repair of the error associated with the error data, is provided to the user using the provided e-mail contact data.

24. The system for providing error repair status data to an application user of claim 21 wherein the application user contact data for the application user includes text message contact data associated with the application user.

25. The system for providing error repair status data to an application user of claim 24 wherein the application user error notification data, including the error repair status data associated with the repair of the error associated with the error data, is provided to the user using the provided text message contact data.

26. The system for providing error repair status data to an application user of claim 21 wherein the error data associated with the application request data is received from the application.

27. The system for providing error repair status data to an application user of claim 21 wherein the error data associated with the application request data is received from a computing system associated with the application user.

* * * * *